United States Patent [19]
Uematsu et al.

[11] Patent Number: 5,464,225
[45] Date of Patent: Nov. 7, 1995

[54] OIL LEAKAGE PREVENTIVE METHOD

[75] Inventors: Kazuyoshi Uematsu, 1-3-11 Uwahara, Shimizu, 424; Kishio Takeshita, Shizuoka; Minoru Ozawa, Shimizu, all of Japan

[73] Assignee: Kazuyoshi Uematsu, Shimizu, Japan

[21] Appl. No.: 90,690

[22] Filed: Jul. 13, 1993

[51] Int. Cl.$^6$ ................................................. B65D 53/06
[52] U.S. Cl. .................. 277/1; 277/227; 277/DIG. 6
[58] Field of Search ............ 277/1, 227, 237 R, 277/DIG. 6; 528/59, 73, 90, 93, 99, 374; 525/454, 504, 505, 528, 535

[56] References Cited

U.S. PATENT DOCUMENTS

| | | | |
|---|---|---|---|
| 3,363,026 | 1/1968 | Schroll | 260/831 |
| 3,891,583 | 6/1975 | Drisko et al. | 260/18 EP |
| 4,092,293 | 5/1978 | Harris et al. | 260/47 EC |
| 4,126,505 | 11/1978 | Garnish et al. | 156/330 |
| 4,177,173 | 12/1979 | Carr | 260/18 EP |
| 4,383,090 | 5/1983 | Slocki et al. | 525/502 |
| 4,582,889 | 4/1986 | Yamaguchi et al. | 528/59 |
| 4,623,702 | 11/1986 | Grieves et al. | 525/528 |
| 4,879,414 | 11/1989 | Johnson et al. | 564/388 |
| 4,902,736 | 2/1990 | Nonaka et al. | 524/296 |
| 5,098,505 | 3/1992 | Goel et al. | 156/307.3 |

FOREIGN PATENT DOCUMENTS

3-2917  1/1991  Japan.

*Primary Examiner*—William A. Cuchlinski, Jr.
*Assistant Examiner*—John L. Beres
*Attorney, Agent, or Firm*—Kanesaka & Takeuchi

[57] ABSTRACT

After removing foreign matters on surfaces of joint portions of two members of a potential transformer, a first sealing agent obtained by mixing liquid A including an epoxy resin as a main component and liquid B including liquid polymercaptan as a main component is coated on the cleaned surfaces and hardened. A second sealing agent obtained by mixing liquid C including an epoxy resin as a main component and liquid D including liquid modified polyamine as a main component may be applied to the hardened first sealing agent, so that oil contained in the potential transformer can be positively prevented, and, at the same time, repairing work of a portion where oil leaks can be easily and quickly carried out.

3 Claims, 8 Drawing Sheets

OIL LEAKAGE PREVENTIVE METHOD

BACKGROUND OF THE INVENTION AND RELATED ART STATEMENT

The present invention relates to an oil leakage preventive method. More particularly, the present invention relates to an oil leaking preventive method wherein a repair work for a potential transformer from which oil leaks is simply and quickly carried out.

When electric current of a high voltage transmitted from a power station is transformed to that of an ordinary voltage to be used, a potential transformer has been used.

Figure 8:
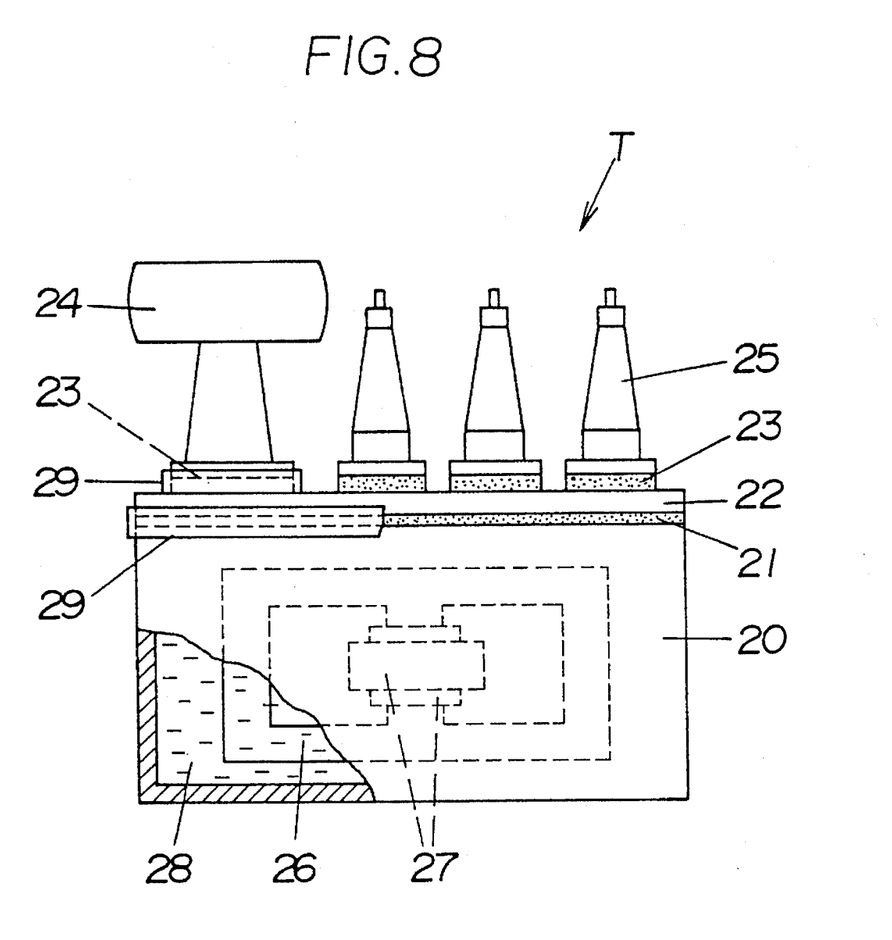
FIG. 8 is an explanatory view of a potential transformer where a conventional oil preventive agent is applied.

The potential transformer T, as shown in FIG. 8, comprises a metal body 20 in a form of a specific box, a packing 21, a canopy 22 provided on the body through the packing 21, a packing 23, a conservator 24 disposed on the canopy 22 through the packing 23, bushings 25 and necessary equipments such as a radiator, not shown.

A core 26 and coils 27 are received in the body 20, and potential transformer oil 28 such as mineral oil is also contained therein to insulate and cool the core 26 and coils 27. The oil 28 is tightly sealed in the body not to leak through the packing 21.

The packing used for the potential transformer is formed of nitrile rubber as a main raw material, and a vulcanized substance of nitrile rubber or a vulcanized substance of a mixture of nitrile rubber and cork is usually used.

However, although the packing comprising the nitrile rubber as a main material is generally satisfactory for an oil-resistant property and an earthquake-resistant property, the packing deteriorates in a short period of time due to a low heat-resistant property of the packing against heat such as Joule's heat generated during operation of the potential transformer, so that oil leakage is incurred.

In such a case, of course, the deteriorated packing can be replaced with a new packing. However, for instance, a large potential transformer having approximately a rated capacity of 3,600 KVA and a rated power of 33,000 V weighs several tens of tons, so that it is very difficult to lift a canopy of the potential transformer for exchanging the deteriorated packing with a new one, which requires a long period of time and a high cost for exchanging bolts and with a wrecker.

Moreover, in case a potential transformer is installed in a building, when a canopy is removed, a beam of a wrecker may be interrupted by a ceiling of the building, so that the canopy cannot be lifted. Therefore, in this industry, a portion where oil leakage occurs has been repaired by coating a sealing agent 29.

The sealing agent comprises liquid A prepared by mixing 40 to 70 parts of a liquid epoxy resin and 30 to 50 parts of an inorganic filler and having a viscosity of 300,000 to 1,000,000, and liquid B prepared by mixing 40 to 60 parts of liquid polysulfide rubber and 30 to 50 parts of an inorganic filler and having a viscosity of 300,000 to 1,000, 000. (Japanese Patent Publication No. Hei 3-2917)

However, there has been a problem such that since the sealing agent requires a long period of hardening time, if the potential transformer is operated before the sealing agent is completely hardened, the intimate contact of the sealing agent is weakened by an oil pressure therein and complete sealing effect cannot be obtained. Further, the long period of hardening time delays resumption of the operation of the potential transformer, which results in a secondary detrimental effect due to electric power suspension as well as unsuitability for a work which requires quick hardening.

OBJECT AND SUMMARY OF THE INVENTION

The present invention is to solve the above described problems, and to provide an oil leakage preventive method wherein a repair work for a potential transformer from which oil leaks is simply and quickly carried out.

A first sealing agent is obtained by mixing liquid A as a base and liquid B as a curing agent, so that a hardening speed is adjusted and a thioxotropy is imparted thereto. Thus, even if a coated layer is thin, it is provided with an oil-resistant property, a heat-resistant property and a shock-resistant property due to the flexibility, and oil can be positively prevented from leaking from the potential transformer.

Further, the coated layer of the first sealing agent is cured for a short period of time due to a quick drying property, and, immediately after the first sealing agent is applied, a second sealing agent can be coated thereon, so that time required for a repairing work can be greatly reduced, and also the suspended time of the potential transformer is reduced as much as possible to reduce the secondary detrimental effect due to electric power suspension.

Furthermore, the second sealing agent is obtained by mixing liquid C as a base with liquid D as a curing agent, by which the thin coated layer is provided with physical properties necessary for an electric conductor such as an insulating property, an anticorrosive property, a shock-resistant property and a weather-resistant property, so that corrosion and rust which may be caused by droppings of birds, feces of beasts, wind and rain can be prevented.

Also, a short circuit and electric leakage of an electric conductor which may be caused by contact with birds, beasts, man-made foreign matters or flying foreign matters can be prevented.

Further, since the second sealing agent has a satisfactory insulating property, even if a worker for repair or inspection inadvertently contacts an electric conductor, an accident by an electric shock does not occur so that the worker can be safely engaged in the work and, at the same time, the coating obtained by applying the agent does not obstruct the repair work and the inspection, and facilitates the work.

Thus, the first sealing agent of the invention comprising liquid A and liquid B is solidified quickly, so that leakages can be quickly stopped by the first sealing agent. While the second sealing agent of the invention comprising liquid C and liquid D takes a relatively long curing time such as 12 to 24 hours, when applied onto the solidified first sealing agent, the second sealing agent protects the first sealing agent. Further, the second sealing agent has a flexibility, so that the work can be easily performed as well as good appearance can be obtained. Therefore, when the second sealing agent is applied onto the solidified first sealing agent, advantages of both the agents produce a synergistic effect, so that a highly oil-preventive effect can be obtained.

DETAILED DESCRIPTION OF THE PREFERRED EMBODIMENT

Hereinunder, referring to the drawings, embodiments of sealing agents for preventing oil leakage and an oil leakage preventive method for a potential transformer according to the present invention are described.

Figure 1:
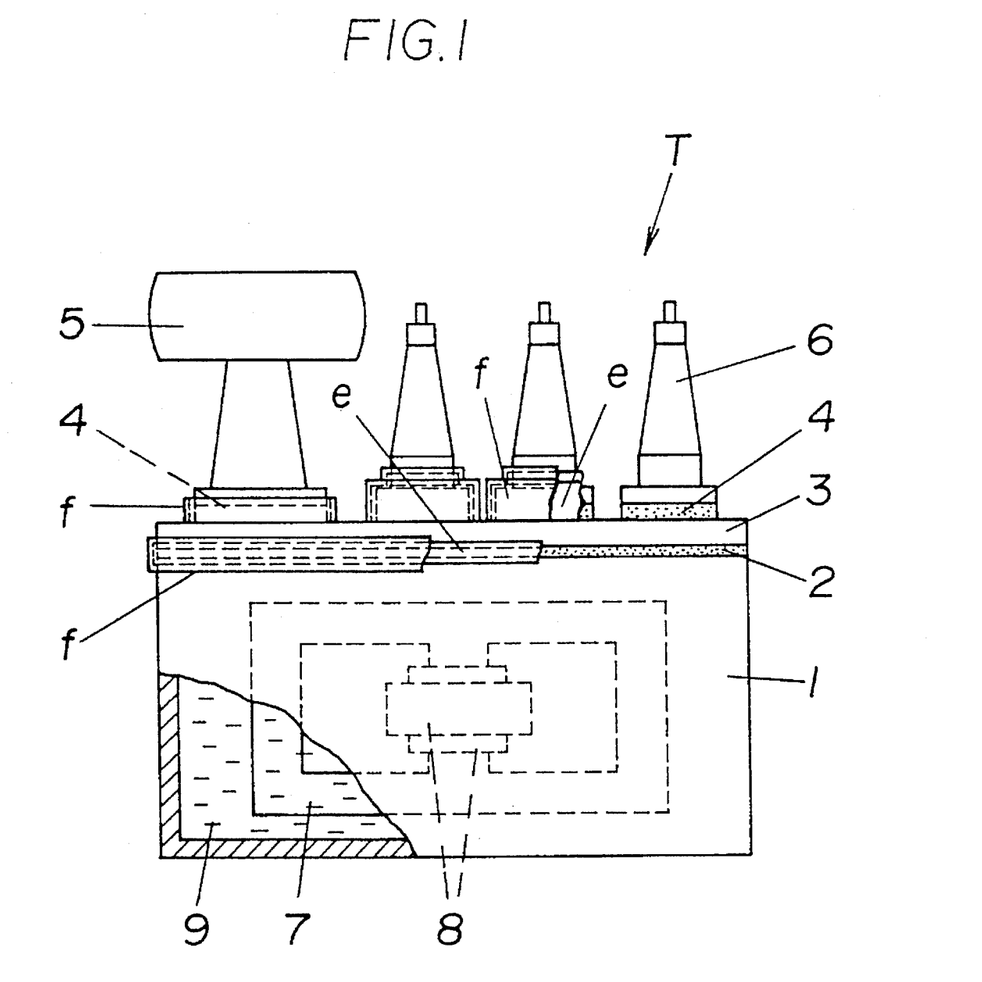
FIG. 1 is an explanatory view of a potential transformer adapting a method of oil leakage prevention of an embodiment according to the present invention.

FIG. 1 shows a potential transformer T installed in the middle of a transmission line for transmitting electricity from a power station to a plant or a house. The potential transformer T transforms electric current of a high voltage of several ten thousands from the power station to a usable voltage of 100 to 200 volts.

A housing 1 of the potential transformer T is formed into an iron box with a predetermined shape. A canopy 3 is mounted on the housing 1 through a packing 2 prepared by a vulcanized substance of nitrile rubber, or a vulcanized substance of a mixture of nitrile rubber and cork as a main raw material, so that the housing 1 is tightly closed.

Necessary apparatus, or equipments such as a conservator 5, bushings 6, and a radiator, not shown, are disposed on the canopy 3 through packings 4 prepared by a material having the same effects as those of the packing 2.

The casing 1 has a core 7 therein around which primary and secondary coils 8 are wound, for transforming to a desired current or voltage.

The casing 1 is filled with potential transformer oil 9 to immerse the core 7 and coils 8 therein.

The potential transformer oil 9 is used as an insulator and a coolant, and the prevailing mineral oil refined from crude oil is generally used.

Although the oil 9 is tightly sealed in the casing 1 not to leak therefrom through the packings 2 and 4, the oil gradually starts leaking through the packings 2 and 4 with lapse of time due to physical properties of the packings 2 and 4 and vibrations generated during operation of the potential transformer T.

It has been recognized that joint portions, or oil leaking portions of the potential transformer T are found, as described before, between the casing 1 and the conservator 5 fixed thereto through the packing 4, between the casing 1 and the bushings 6 attached thereto through the packing 4, between the casing 1 and the canopy 3 fixed thereto through the packing 2, and in spaces of bolts 10 and nuts 11 for tightening these two members 1 and 5, or 1 and 6.

In the following, the first and second sealing agents to be coated on joint portions of two members, i.e., the casing 1 and the conservator 5, the casing 1 and the bushings 6, or the casing 1 and the canopy 3, are described. The first and second sealing agents comprise liquids A and B, and liquids C and D, respectively.

The liquid A of the first sealing agent constitutes a base or a main agent of a sealing agent, such as a coating material and an adhesive agent, and is obtained by mixing a liquid epoxy resin or a liquid-type modified epoxy resin (hereinafter referred to as "a liquid modified epoxy resin") and powder of aluminum oxide at a predetermined rate. The aluminum oxide is added to provide heat resistance against heat from the potential transformer T.

Further, the epoxy resin constituting a main component of liquid A, while a molecular structure thereof need not be particularly limited, is required to be a liquid in a state of monomer, or to have a fluidity when dissolved in a small quantity of an organic solvent.

Also, since the sealing agent is desirable to have a flexibility after cured, a liquid-type modified epoxy resin, such as a bisphenol A-type epoxy modified by polysulfide, or epoxy resin modified by urethane or rubber, may be used.

In 100% by weight of liquid A, 1. 55 to 75% by weight of liquid epoxy resin or liquid modified epoxy resin, and 2. 25 to 45% by weight of aluminum oxide powder are appropriately mixed in accordance with places to be used or conditions to be used, with a viscosity of 1,000,000 to 2,000,000 cps.

Liquid B to be used as a curing agent for liquid A, is obtained by mixing a liquid polymercaptan as a base, a liquid tertiary amine, an inorganic filler such as light calcium carbonate for reinforcing the amine and increasing a volume of the base, and aluminum silicate for adjusting a shock-resistant property, a weather-resistant property and a fluidity, or, imparting a thioxotropy thereto, at a predetermined rate.

Polymercaptan as a main component, as described above, is in a form of liquid with a suitable fluidity and, by adding tertiary amine thereto, has characteristics for quickly curing the epoxy resin at an atmospheric temperature or a relatively lower temperature, and for imparting a flexibility to the epoxy resin after it is cured.

Further, an inorganic filler and an agent for imparting a thioxotropy can be suitably added to the liquid B according to conditions to be used and conditions to be coated.

In 100% by weight of liquid B, 1. 35 to 45% by weight of liquid polymercaptan, 2. 5 to 10% by weight of liquid tertiary amine, 3. 35 to 55% by weight of an inorganic filler, and 4. 1 to 3% by weight of aluminum silicate are suitably mixed in accordance with places to be used and conditions to be used, with a viscosity of 80,000 to 150,000 cps.

The mixing of the above ingredients is carried out such that the additives are added to the liquid epoxy resin or the liquid polymercaptan from the lowest specific gravity to the highest specific gravity in this order, the mass is mixed in a known stirrer, and is passed through three rolls for coating two times.

While there is no particular necessity for limiting the order of adding the above additives 1 through 4, it is required that the additives are mixed uniformly.

While the first sealing agent by itself has a sufficient oil leakage preventive effect, it exhibits more oil leakage preventive effect when used together with the second sealing agent.

Next, liquid C of the second sealing agent is a base or main agent of a second sealing agent for a coating material and an adhesive agent and is obtained by mixing a liquid-type modified epoxy resin (hereinafter referred to as "a liquid modified epoxy resin"), an inorganic filler such as light calcium carbonate for strengthening the liquid modified epoxy resin and increasing a quantity of the liquid modified epoxy resin of a high cost, an inorganic pigment such as anatase-type titanium dioxide to turn liquid C to white color when mixed with the inorganic filler, and aluminum silicate to obtain a shock resistant property, a weather-resistant property, a fluidity, or thioxotropy, at a predetermined rate.

In 100% by weight of liquid C, 1. 50 to 90% by weight of a liquid modified epoxy resin,
2. 5 to 45% by weight of an inorganic filler (including inorganic pigment), and
3. 0.5 to 5.0% by weight of aluminum silicate are suitably mixed according to a place to be used and conditions to be used, with a viscosity of 50,000 to 800,000 cps.

Liquid D to be used as a curing agent of liquid C, is obtained by mixing a liquid-type modified polyamine (hereinafter referred to as "a liquid modified polyamine") for curing an epoxy resin, an inorganic filler such as light calcium carbonate for strengthening the polyamine and for increasing the quantity of the epoxy resin of a high cost as in the case of liquid C, and aluminum silicate to adjust a shock resistant property, a weather-resistant property and a fluidity, or to obtain thioxotropy, at a predetermined rate.

In 100% by weight of liquid D, 1. 50 to 90% by weight of a liquid modified polyamine for curing epoxy resin,
2. 5 to 45% by weight of an inorganic filler, and
3. 0.5 to 5.0% by weight of aluminum silicate are suitably mixed according to a place to be used and conditions to be used, with a viscosity of 3,000 to 200,000 cps.

The mixing of the above ingredients is carried out such that the additives are added to the liquid modified epoxy resin or the liquid modified polyamine for curing the epoxy resin from the lowest specific gravity to the highest specific gravity in this order, the mass is mixed in a known stirrer, and is passed through three rolls for a coating material three times.

While there is no particular necessity for limiting the order of adding the above additives 1 through 3, it is necessary to mix the mass uniformly.

Incidentally, the organic pigments to be added to the liquids C and D are to give a desired color to the sealing agent. It is possible that the organic pigment for liquid C colors the liquid to white and the organic pigment for liquid D colors the liquid to a different color, and when liquids C and D are mixed, the desired color can be obtained.

When the mixing rates of the components in the above mentioned liquids A, B, C and D are within the ranges specified above, the respective liquids can be easily mixed with each other. While if the ranges are outside, the respective liquids cannot be mixed uniformly, nor fluidities suitable for coating the agents obtained therefrom can be obtained. That is, the viscosities of the agents are too low or too high, so that it is difficult to coat the agents. Further, the first agent obtained from the liquids A and B is solidified in a short time and results in a satisfactory product when mixed within the specified ranges. If the mixing rates are below or above, the first agent is hard to solidify and does not have sufficient flexibility after solidified, to thereby result in poor products. When resin components are beyond the specified ranges, the sufficient amounts of the filler are not contained in the liquids, and the ultraviolet ray transmittance is increased, so that the weatherability is decreased. Further, the fluidity is increased and a good workability cannot be obtained, so that the necessary coating thickness cannot be obtained either. When the filler is excessive, the filler is not well mixed with the liquid, so that the hardened substance becomes brittle and loses the flexibility, thus to likely be broken.

Next, an embodiment of an oil leakage preventive method applied to a potential transformer T in use of the first and the second sealing agents is described.

Figure 2:
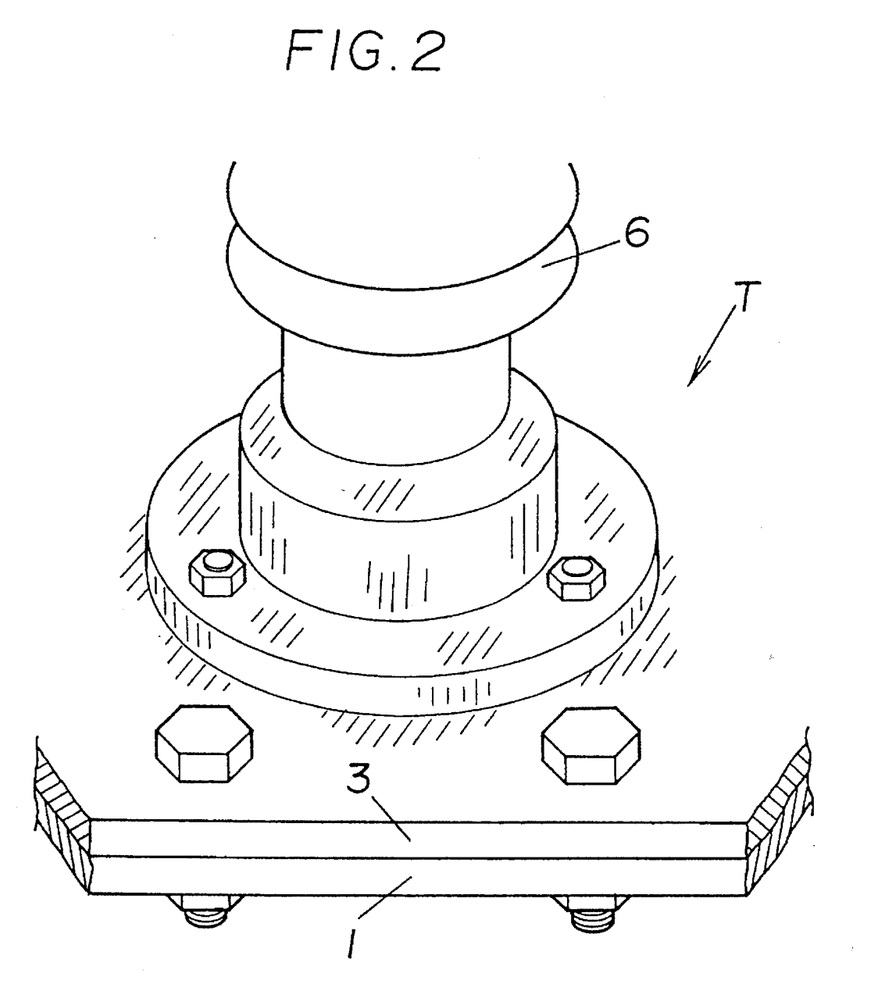
FIG. 2 is an explanatory view showing a part of the potential transformer in a state where surface foreign matters at a joint portion of two members in FIG. 1 are removed.

First, joint portions between two members of the potential transformer T, such as between the housing 1 and the conservator 5, between the housing 1 and the bushing 6, and between the housing 1 and the canopy 3, or oil leaking portions are cleaned beforehand by peeling off foreign matters, such as rust, oil and old coatings on the surfaces, polishing the surfaces from which foreign matters have been removed and washing the surfaces so that the first sealing agent can be firmly adhered thereto.

Figure 3:
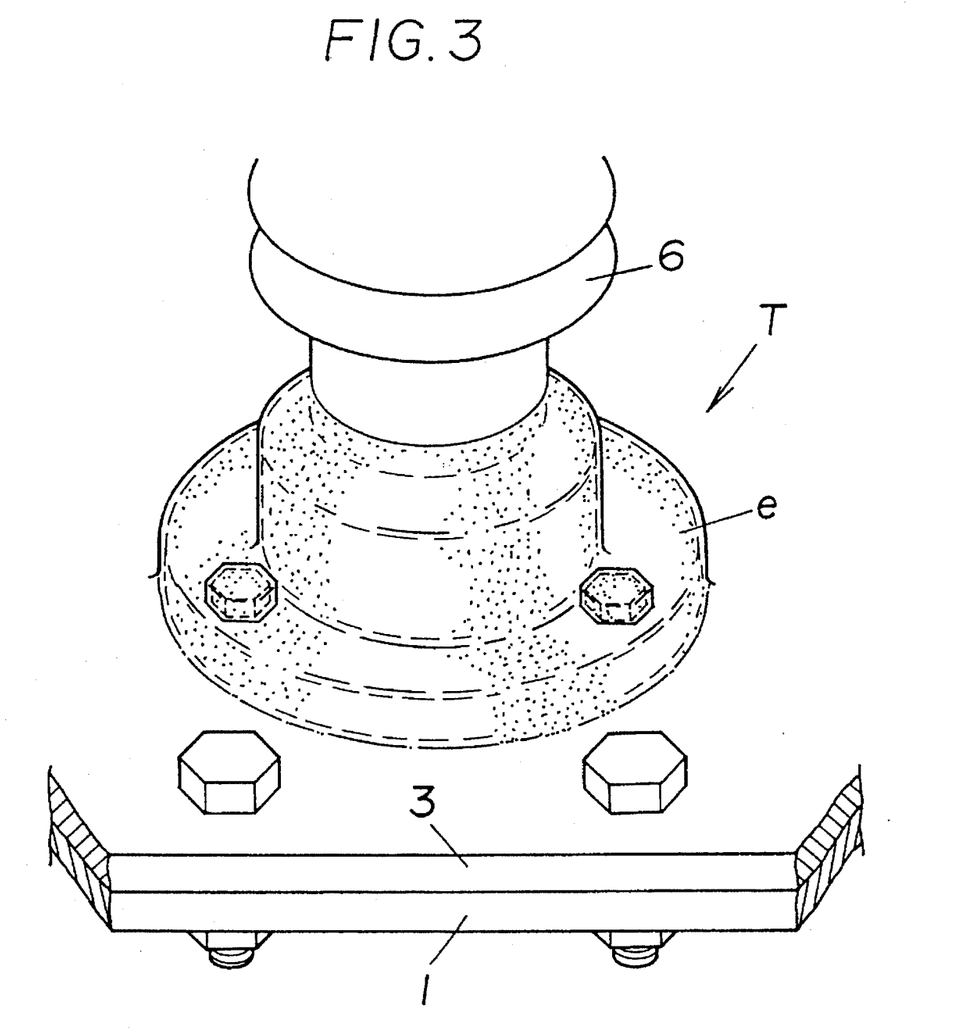
FIG. 3 is an explanatory view showing a part of the potential transformer in a state where the portion without the surface foreign matters in FIG. 2 is coated with a first sealing agent.

Then, the liquids A and B are mixed with a predetermined viscosity to obtain a first sealing agent. The first sealing agent is coated around the packings 2 and 4 of the joint portions or oil leaking portions to form a coating layer e as a foundation coat.

The first sealing agent has a strong adhesive force against the joint portions or oil leaking portions, quickly cures, for example, in 5 to 10 minutes, and is excellent in an oil-resistant property and a heat-resistant property.

Further, the first sealing agent has a sufficient flexibility, and the coating layer e is formed in a thickness of 1 to 3 mm so that the coating layer e does not undergo cracks due to vibrations generated during operation of the potential transformer T.

The coating layer e is formed of the first sealing agent obtained by preparing and mixing liquids A and B at a predetermined mixing ratio, and the thus prepared and mixed liquids A and B having different properties, i.e., liquid A as a base (main agent) and liquid B as a curing agent therefor, are stirred and mixed right before the mixture is applied to the joint portions or the oil leaking portions of the potential transformer T.

The mixture is uniformly applied to the joint portions or the oil leaking portions, in a liquid state, with a brush or a spatula.

After the coating layer e of the first sealing agent is cured, the second sealing agent is applied onto the cured surface. The second sealing agent is obtained by mixing the liquids C and D at a predetermined viscosity.

The second sealing agent is uniformly applied onto the coating layer e in a thickness of 1 to 3 mm with a brush or a spatula to form a coating layer f. The coating layer f has a slow curing time of about 24 hours, but is excellent in the insulating property, anticorrosive property, shock-resistant property and weather-resistant property.

Figure 6:
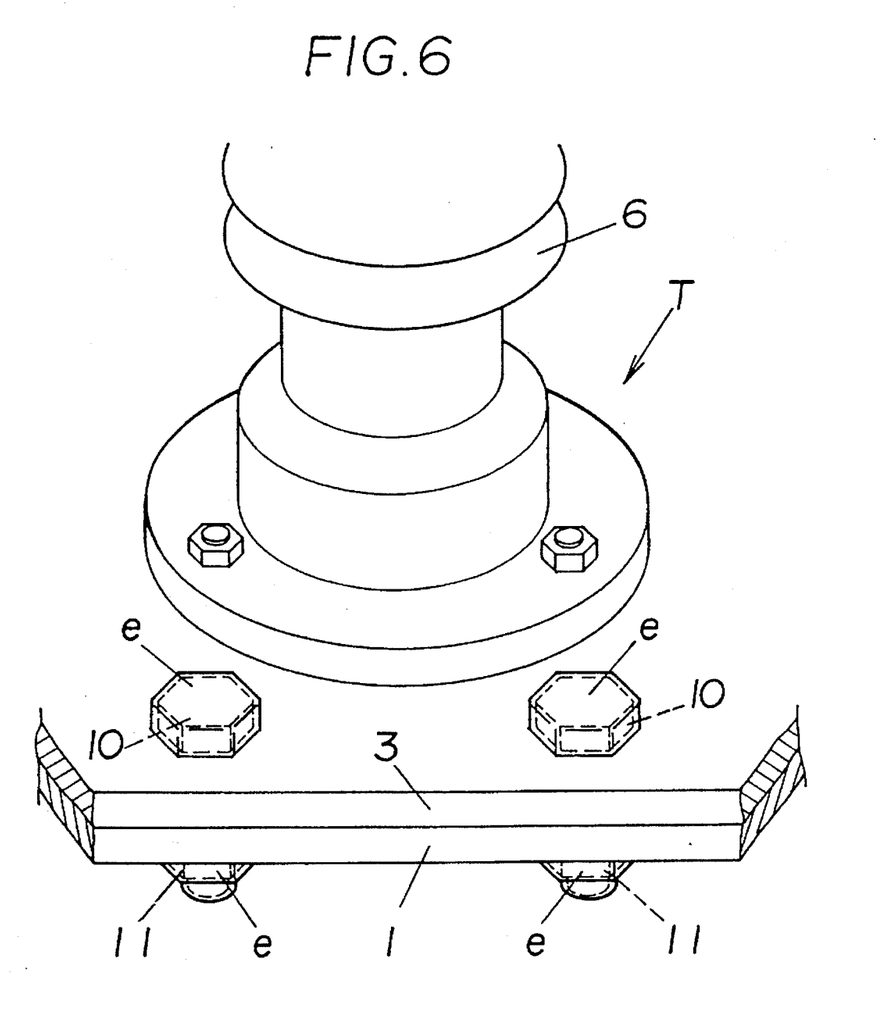
FIG. 6 is an explanatory view showing a part of the potential transformer in a state where the joint portion in FIG. 1 is tightened with bolts and nuts.

When the bolts 10 and the nuts 11 for tightening the housing 1 and the canopy 3 are subjected to an oil leakage treatment, after foreign matters on the surfaces of the joint portions of the housing 1 and the canopy 3 are removed, as shown in FIG. 6, the first sealing agent is applied to the joint portions of the housing 1 and the canopy 3 as a foundation coating to obtain a coating layer e, and the second sealing agent is applied to the bolts 10 and nuts 11 on which the coating layer e has already been provided.

Figure 7:
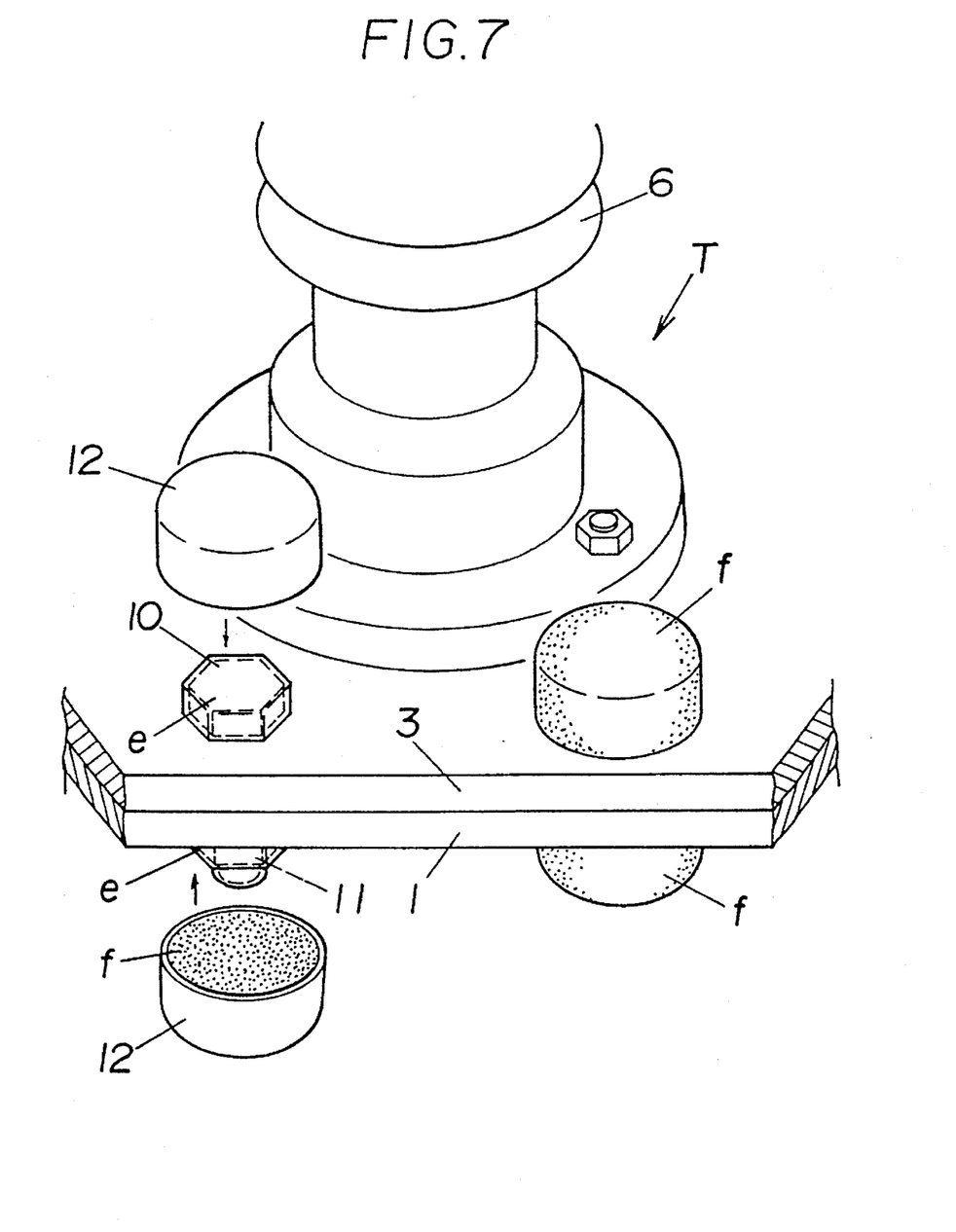
FIG. 7 is an explanatory view showing a part of the potential transformer in a state where caps are coated with the first sealing agent in their interiors and put on bolts and nuts in FIG. 6.

Or, as shown in FIG. 7, the second sealing agent is filled in caps 12, 12 of a predetermined shape to form a coating layer f, which are applied over the bolt 10 and the nut 11.

Also, if the second sealing agent is applied to the surfaces of the caps 12, 12 to form a coating layer f thereon, the oil-leakage preventive effect can be more improved.

Figure 4:
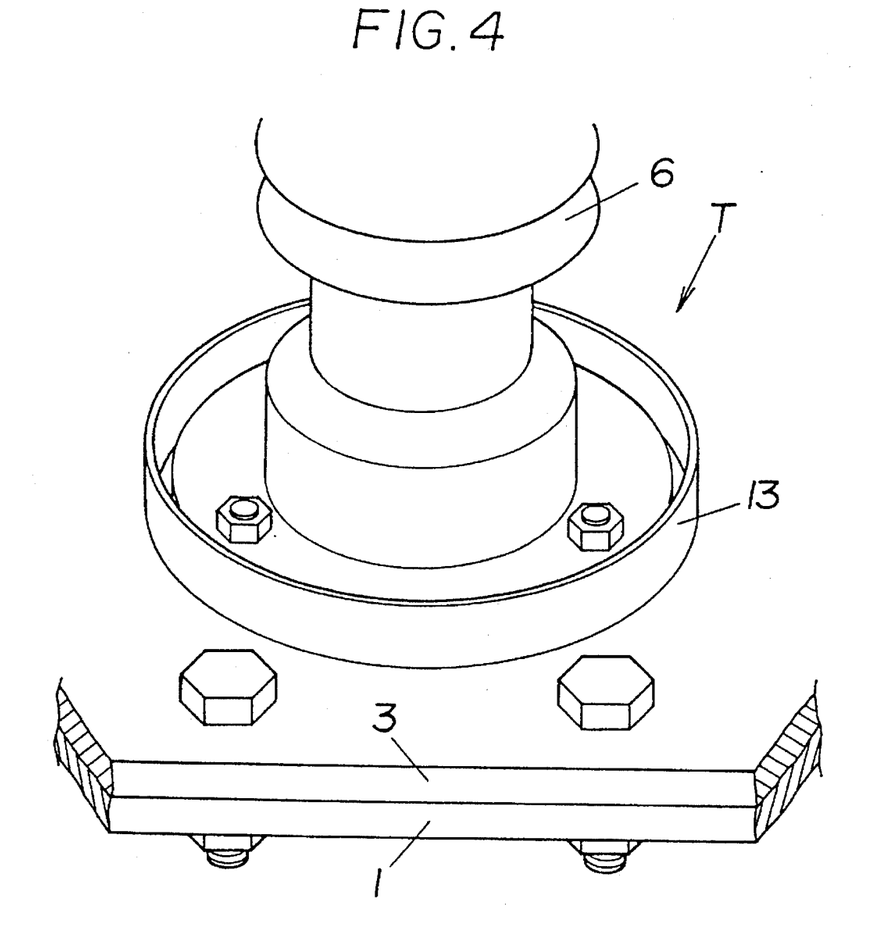
FIG. 4 is an explanatory view showing a part of the potential transformer in a state where a circular shape frame is mounted on the joint portion in FIG. 1.

Further, in the present oil leakage preventive treatment, as shown in FIG. 4, after foreign matters on the surfaces of the joint portions 1 and 5 or joint portions 1 and 6 are peeled off and polished, a cylindrical frame 13 with a predetermined height is mounted on the polished portion so that the frame 13 covers the joint portion 5 or 6, and the first sealing agent is applied to the joint portions 1 and 5, or, the joint portions 1 and 6 to obtain a coating layer e.

Figure 5:
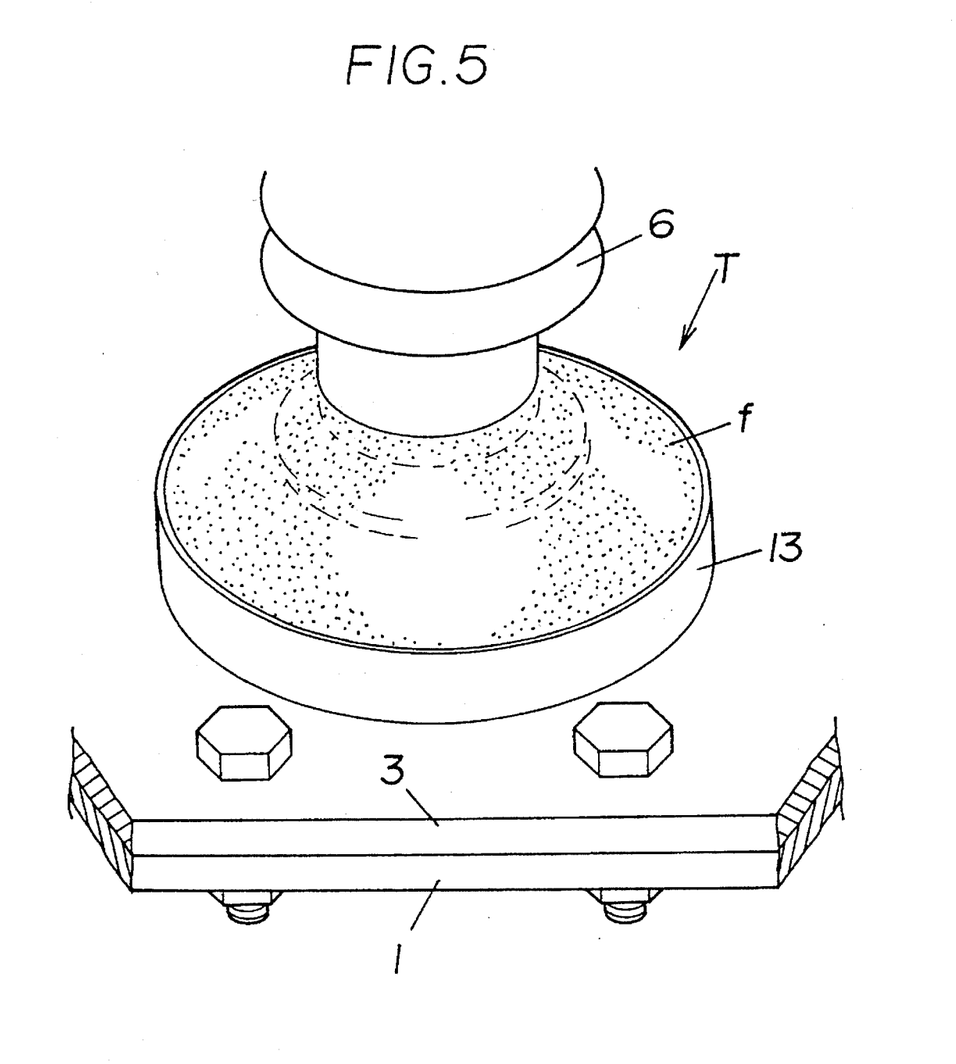
FIG. 5 is an explanatory view showing a part of the potential transformer in a state where the circular shape frame in FIG. 4 is filled with a second sealing agent.

Then, the second sealing agent may be poured into the cylindrical frame 13 to fill to the upper edge thereof to obtain a coating layer f.

If an easy peeling-off sheet (not shown) is attached to an inner circumference of the cylindrical frame 13, the mold can be easily removed. For the cylindrical frame 13, a highly compressed cork material (a sheet-shape material) may be used.

Next, examples of the first sealing agents are shown below.

EMBODIMENT 1

A basic mixing example which is ordinarily used.
Liquid A (100% by weight)
  1. 60% by weight of bisphenol A-type epoxy resin (produced by Asahi Denka Co, EP-4100)
  2. 40% by weight of aluminum oxide powder (produced by Yamaishi Metal Co, YP-580)
Liquid B (100% by weight)
  1. 40% by weight of polymercaptan (produced by Asahi Denka Co., EH-317)
  2. 10% by weight of tertiary amine (produced by Asahi Denka Co., EHC-30)
  3. 48% by weight of light calcium carbonate (produced by Shiraishi Calcium Co.)
  4. 2% by weight of aluminum silicate (produced by Nihon Earojiru Co., #300)

The above liquids A and B were mixed at a mixing ratio of 1:1 to obtain a first sealing agent. The properties and performances of the liquids and the cured substance are shown in Table 1.

TABLE 1

| | Liquid A | Liquid B |
|---|---|---|
| Appearance | silver color paste | light greenish yellow paste |
| Specific gravity at 20°C. | 1.22 | 1.36 |
| Viscosity at 20°C. | 1,500,000 cps | 90,000 cps |
| Solid content | 99.8% or more | |
| Mixing ratio of liquid A:liquid B | 1:1 ±15% | |
| Usable time | 4 minutes in summer 8 minutes in winter | |
| Curing time | 5 minutes in summer 12 minutes in winter | |
| Hardness after hardening | 80 D (shore hardness) | |

EMBODIMENT 2

A mixing example of the first sealing agent superior to the first Embodiment in flexibility and adhesiveness
Liquid A (100% by weight)
  1. 70 % by weight of polysulfide modified epoxy resin (produced by Toray Co., FREP-50)
  2. 30% by weight of aluminum oxide powder (produced by Ishiyama Metal Co., YP-580)
Liquid B (100% by weight)
  1. 38% by weight of polymercaptan (produced by Asahi Denka Co., EH-317)
  2. 8% by weight of tertiary amine (produced by Asahi Denka Co., EHC-30)
  3. 30% by weight of light calcium carbonate (produced by Shiraishi Calcium Co.)
  4. 22% by weight of heavy calcium carbonate (produced by Shiraishi Calcium Co.)
  5. 2% by weight of aluminum silicate (produced by Nihon Earojiru Co., #300)

The above liquids A and B were mixed at a mixing ratio of 2:1 to obtain a first sealing agent. The properties and performances of the liquids and the cured substance are shown in Table 2.

TABLE 2

| | Liquid A | Liquid B |
|---|---|---|
| Appearance | silver color paste | light greenish yellow paste |
| Specific gravity at 20° C. | 1.21 | 1.38 |
| Viscosity at 20° C. | 1,300,000 cps | 130,000 cps |
| Solid content | 99.8% or more | |
| mixing ratio of Liquid A:Liquid B | 2:1 ±15% | |
| Usable time | 5 minutes in summer 10 minutes in winter | |
| Curing time | 7 minutes in summer 16 minutes in winter | |
| Hardness after hardening | 65 D (Shore hardness) | |

Next, the first sealing agents obtained in Embodiments 1 and 2 were tested by applying them to oil leaking portions of a potential transformer, and the results are shown in Tables 3 and 4.

TABLE 3

| Embodiment 1 | | |
|---|---|---|
| Tensile shearing strength (steel plate/steel plate) | 185 Kg/cm² 76 Kg/cm² | at 25° C. at 80° C. |
| Tensile peeling strength (steel plate/steel plate) | 11 Kg/20 mm 7 Kg/20 mm | at 25° C. at 80° C. |
| Adhesive tensile peeling strength on insulating oil wet surfaces (steel plate/steel plate) | 9.6 Kg/20 mm 6.8 Kg/20 mm | at 25° C. at 80° C. |

TABLE 4

| Embodiment 2 | | |
|---|---|---|
| Tensile shearing strength (steel plate/steel plate) | 130 Kg/cm² 68 Kg/cm² | at 25° C. at 80° C. |
| Tensile peeling strength (steel plate/steel plate) | 20 Kg/20 mm 10 Kg/20 mm | at 25° C. at 80° C. |
| Adhesive tensile peeling | 18 Kg/20 mm | at 25° C. |

TABLE 4-continued

Embodiment 2

| | | |
|---|---|---|
| strength on insulating oil wet surfaces (steel plate/steel plate) | 8.5 Kg/20 mm | at 80° C. |

Based on the above results, tests carried out on a coated film having a thickness of 1 to 3 mm showed that oil leakage from a potential transformer completely stopped and cracks due to vibrations during operation of the potential transformer did not occur, thus to provide excellent adhesion.

Next, examples of the second sealing agents are shown.

EMBODIMENT 3

A mixing example of the second sealing agent of a thick coating type which does not drip even if the agent is applied to a vertical surface Liquid C (100% by weight)

1. 70% by weight of liquid modified epoxy resin (produced by Toray Co., FREP-50)

2. 16% by weight of light calcium carbonate (produced by Touhoku Chemical Co.)

3. 10% by weight of anatase-type titanium dioxide (produced by Shiraishi Calcium Co.)

4. 4% by weight of aluminum silicate (produced by Nihon Earojiru Co., #300)

Liquid D (100% by weight)

1. 80% by weight of liquid modified polyamine (produced by Asahi Denka Co., EH-228)

2. 18% by weight of light calcium carbonate (produced by Touhoku Chemical Co.)

3. 2% by weight of aluminum silicate (produced by Nihon Earojiru Co., #300)

The liquids C and D were mixed at a mixing ratio of 4:1 to obtain a second sealing agent. The properties and performances of the liquids and the cured substance are shown in Table 5.

TABLE 5

| | Liquid C | Liquid D |
|---|---|---|
| Appearance | white liquid with high consistency | light yellowish white liquid with high consistency |
| Specific gravity at 20° C. | 1.30 | 1.26 |
| Viscosity at 20° C. | 260,000 cps | 150,000 cps |
| Mixing ratio of liquid C:liquid D | 4:1 ±15% | |
| Solid content | 99.8% | |
| Usable time | 25 minutes in summer 40 minutes in winter | |
| Hardness to contact | 2 hours in summer 5 hours in winter | |
| Hardness (D) | 75 | 72 |

EMBODIMENT 4

A mixing example of a second sealing agent prepared with a lower viscosity when compared with the agent obtained in Embodiment 3, wherein thin coating is easily made.

Liquid C (100% by weight)

1. 85% by weight of liquid modified epoxy resin (produced by Toray Co., FREP-50)

2. 4% by weight of light calcium carbonate (produced by Touhoku Chemical Co.)

3. 10% by weight of anatase-type titanium dioxide (produced by Shiraishi Calcium Co., TCA-555)

4. 1% by weight of aluminum silicate (produced by Nihon Earojiru Co., #300)

Liquid D (100% by weight)

1. 89% by weight of liquid modified polyamine (produced by Asahi Denka Co., EH-228)

2. 10% by weight of light calcium carbonate (produced by Shiraishi Calcium Co.)

3. 1% by weight of aluminum silicate (produced by Nihon Earojiru Co., #300)

The above liquids C and D were mixed at a mixing ratio of 4:1 to obtain a second sealing agent. The mixing method was the same as explained before. The properties and performances of the liquids and the cured substance are shown in Table 6.

TABLE 6

| | Liquid C | Liquid D |
|---|---|---|
| Appearance | white consistency liquid | light yellowish white consistency liquid |
| Specific gravity at 20° C. | 1.27 | 1.23 |
| Viscosity at 20° C. | 80,000 cps | 10,000 cps |
| Mixing ratio of Liquid C:Liquid D | 4:1 ±15 | |
| Solid content | 99.8% | |
| Usable time | 25 minutes in summer 40 minutes in winter | |
| Curing to contact | 2 hours in summer 5 hours in winter | |
| Hardness (D) | 75 | 72 |

Preparation and mixing were carried out based on the conditions as described above, and the second sealing agents obtained according to Embodiments 3 and 4 were colored white.

The sealing agents obtained at Embodiments 3 and 4 were coated on copper bars to be used in a potential transformer and tests necessary for conducting electricity were carried out. The results are shown in Table 7.

TABLE 7

| | Embodiment 3 | Embodiment 4 |
|---|---|---|
| Tensile shearing strength (steel plate/steel plate) | 92.0 Kg/cm$^2$ | 84.0 Kg/cm$^2$ |
| Withstand Voltage | | |
| Break-down voltage (in 1 mm thickness) | 27.6 KV | 29.0 KV |
| Break-down voltage (in 2 mm thickness) | 36.3 KV | 37.2 KV |
| Break-down voltage (in 3 mm thickness) | 50.0 KV or more | 50.0 KV or more |

As shown above, in the tests carried out on coated films with a thickness of from 1 to 3 mm, the second sealing agents obtained in Embodiments 3 and 4 showed good results when used as sealing agents for copper bars usually transmitting an electric current of 6,600 voltage.

Next, an example of the second sealing agent applied onto the cured first sealing agent is shown below.

EMBODIMENT 5

Combination of the first sealing agent and the second sealing agent when the second sealing agent is applied onto the cured first sealing agent, wherein a good result is obtained when the sealing agents are used for stopping oil leakage of a potential transformer.

Liquid A (100% by weight)
1. 60% by weight of bisphenol A-type epoxy resin (produced by Asahi Denka Co., EP-4100)
2. 40% by weight of aluminum oxide powder (produced by Yamaishi Metal Co., YP-580)

Liquid B (100% by weight)
1. 40% by weight of polymercaptan (produced by Asahi Denka Co., EH-317)
2. 10% by weight of tertiary amine (produced by Asahi Denka Co., EHC-30)
3. 48% by weight of light calcium carbonate (produced by Shiraishi Calcium Co.)
4. 2% by weight of aluminum silicate (produced by Nihon Earojiru Co., #300).

The above liquids A and B were mixed at a mixing ratio of 1:1 to obtain a first sealing agent. The properties and performances of the liquids and the cured substance are shown in Table 8.

TABLE 8

|  | Liquid A | Liquid B |
|---|---|---|
| Appearance | Silver color paste | light greenish yellow paste |
| Specific gravity at 20° C. | 1.22 | 1.36 |
| Viscosity at 20° C. | 1,500,000 cps | 90,000 cps |
| Solid content | 99.8% or more | |
| Mixing ratio of liquid A:liquid B | 1:1 ±15% | |
| Usable time | 4 minutes in summer 8 minutes in winter | |
| Curing time | 5 minutes in summer 12 minutes in winter | |
| Hardness after hardening | 80 D (Shore hardness) | |

Liquids C and D were prepared in the following mixing rates.

Liquid C (100% by weight)
1. 70% by weight of liquid modified epoxy resin (produced by Toray Co., FREP-50)
2. 16% by weight of light calcium carbonate (produced by Touhoku Chemical Co.)
3. 10% by weight of anatase-type titanium dioxide (produced by Shiraishi Calcium Co.)
4. 4% by weight of aluminum silicate (produced by Nihon Earojiru Co., #300)

Liquid D (100% by weight)
1. 80% by weight of liquid modified polyamine (produced by Asahi Denka Co., EH-228)
2. 18% by weight of light calcium carbonate (produced by Touhoku Chemical Co.)
3. 2% by weight of aluminum silicate (produced by Nihon Earojiru Co., #300)

The liquids C and D were mixed at a mixing ratio 4:1 to obtain a second sealing agent. The properties and performances of the liquids and the cured substance are shown in Table 9.

TABLE 9

|  | Liquid C | Liquid D |
|---|---|---|
| Appearance | white liquid with high consistency | light yellowish white liquid with high consistency |
| Specific gravity at 20° C. | 1.30 | 1.20 |
| Viscosity at 20° C. | 260,000 cps | 150,000 cps |
| Mixing ratio of liquid C:liquid D | 4:1 | |
|  | ±15% | |
| Solid content | 99.8% | |
| Usable time | 25 minutes in summer 40 minutes in winter | |
| Hardness to contact | 2 hours in summer 5 hours in winter | |
| Hardness (D) | 75 | 72 |

The following tests were carried out when the second sealing agent was applied onto the first sealing agent coated on an oil leaking place of a potential transformer, and the results are shown in the following Table 10.

TABLE 10

| Tensile shearing strength (steel plate/steel plate) | at 25° C. | 185 kg/cm$^2$ |
|---|---|---|
|  | at 80° C. | 76 kg/cm$^2$ |
| Tensile peeling strength (steel plate/steel plate) | at 25° C. | 11 kg/20 mm |
|  | at 80° C. | 7 kg/20 mm |
| Adhesive tensile peeling strength on insulating oil wet surfaces (steel plate/steel plate) | at 25° C. | 9.6 kg/20 mm |
|  | at 80° C. | 6.8 kg/20 mm |

The tests carried out on the films coated in a thickness of 1 to 3 mm showed good results when the agents were used for preventing oil leakage of a potential transformer.

What is claimed is:

1. An oil leakage preventing method comprising:
    removing foreign matters on a surface of a joint portion of two members of a mechanical device;
    applying to said surface a first sealing agent obtained by mixing a liquid A including a metal powder and one of a liquid epoxy resin and a modified epoxy resin in a liquid form, and a liquid B including liquid polymercaptan, liquid tertiary amine, an inorganic filler and aluminum silicate;
    drying the first sealing agent, and
    applying to the dried first sealing agent a second sealing agent obtained by mixing a liquid C including a modified epoxy resin in a liquid form, an inorganic filler and aluminum silicate, and a liquid D including modified polyamine in a liquid form for hardening epoxy resin, an inorganic filler and aluminum silicate.

2. An oil leakage preventing method according to claim 1, wherein said mechanical device is a potential transformer.

3. An oil leakage preventing method according to claim 1, wherein said metal power is an aluminum oxide power.

* * * * *